(12) United States Patent
Kurapati et al.

(10) Patent No.: US 11,921,605 B2
(45) Date of Patent: Mar. 5, 2024

(54) MANAGING APPLICATIONS IN A CLUSTER

(71) Applicant: Hewlett Packard Enterprise Development LP, Houston, TX (US)

(72) Inventors: Bhakthavatsala Naidu Kurapati, Karnataka (IN); Venkatesh Nagaraj, Karnataka (IN); Manish Ramesh Kulkarni, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/586,921

(22) Filed: Jan. 28, 2022

(65) Prior Publication Data

US 2023/0125909 A1   Apr. 27, 2023

(30) Foreign Application Priority Data

Oct. 21, 2021  (IN) .............................. 202141048008

(51) Int. Cl.
| | |
|---|---|
| *G06F 11/34* | (2006.01) |
| *G06F 11/07* | (2006.01) |
| *G06F 11/14* | (2006.01) |
| *G06F 11/20* | (2006.01) |

(52) U.S. Cl.
CPC ...... *G06F 11/3409* (2013.01); *G06F 11/0709* (2013.01); *G06F 11/0757* (2013.01); *G06F 11/0793* (2013.01); *G06F 11/1425* (2013.01); *G06F 11/143* (2013.01); *G06F 11/2007* (2013.01); *G06F 11/2025* (2013.01); *G06F 11/2028* (2013.01); *G06F 11/203* (2013.01); *G06F 2201/85* (2013.01)

(58) Field of Classification Search
CPC ............ G06F 11/3409; G06F 11/0709; G06F 11/0757; G06F 11/0793; G06F 11/1425; G06F 11/143; G06F 11/2007; G06F 11/2025; G06F 11/2028; G06F 11/203; G06F 2201/85
See application file for complete search history.

(56) References Cited

U.S. PATENT DOCUMENTS

| | | | |
|---|---|---|---|
| 10,382,278 B1 | 8/2019 | Barry et al. | |
| 10,691,493 B1* | 6/2020 | Barry | G06F 9/44505 |
| 11,461,163 B1* | 10/2022 | Aggarwal | G06F 11/0787 |
| 2005/0050197 A1* | 3/2005 | Boyd | G06F 11/1456 |
| | | | 714/E11.12 |
| 2017/0139762 A1* | 5/2017 | Sherlock | G06F 11/0748 |
| 2018/0095855 A1* | 4/2018 | Sanakkayala | G06F 11/1438 |
| 2018/0107502 A1* | 4/2018 | Shang | H04L 43/10 |
| 2019/0124047 A1* | 4/2019 | Thomas | G06F 21/64 |
| 2019/0361626 A1* | 11/2019 | East | G06F 3/0653 |

(Continued)

FOREIGN PATENT DOCUMENTS

| | | |
|---|---|---|
| WO | 2020/231952 A1 | 11/2020 |
| WO | 2020/263874 A1 | 12/2020 |

*Primary Examiner* — Bryce P Bonzo
*Assistant Examiner* — Michael Xu
(74) *Attorney, Agent, or Firm* — Trop, Pruner & Hu, P.C.

(57) ABSTRACT

Approaches for managing applications in a cluster are described. In an example, a first agent may be executing on a first programmable network adapter card installed within a first computing node within a cluster. The first agent may isolate an application executing on the first computing node. Thereafter, the application may be managed by the second computing node.

20 Claims, 7 Drawing Sheets

(56) References Cited

U.S. PATENT DOCUMENTS

| | | | |
|---|---|---|---|
| 2020/0133793 A1* | 4/2020 | Greenwood | G06F 11/2094 |
| 2021/0014113 A1 | 1/2021 | Guim Bernat et al. | |
| 2021/0014114 A1 | 1/2021 | Doshi et al. | |
| 2021/0014133 A1* | 1/2021 | Maciocco | H04L 41/5009 |
| 2021/0021619 A1 | 1/2021 | Smith et al. | |
| 2021/0117242 A1 | 4/2021 | Van De Groenendaal et al. | |
| 2022/0075671 A1* | 3/2022 | Talukdar | G06F 11/2028 |
| 2022/0091922 A1* | 3/2022 | McLaughlin | G06F 11/0751 |
| 2022/0137830 A1* | 5/2022 | Garrett, Jr. | G06F 11/0772 |
| | | | 714/6.2 |
| 2022/0171648 A1* | 6/2022 | Rodriguez | G06F 9/5072 |
| 2023/0029074 A1* | 1/2023 | Chawla | G06F 11/0757 |

* cited by examiner

MANAGING APPLICATIONS IN A CLUSTER

BACKGROUND

Clustering allow different computing devices, referred to as nodes, to operate together to function as a unified computing resource. These types of architectures feature in data centres having a plurality of computing nodes or servers for processing a variety of workloads. The computing nodes are capable of implementing a variety of computational functions, such as I/O packet processing or workload management, without loading core processing units of the computing nodes. In addition, the computing nodes may also monitor and manage failures or errors to ensure continuous operations or availability of computing nodes for an extended period.

BRIEF DESCRIPTION OF FIGURES

Systems and/or methods, in accordance with examples of the present subject matter are now described, by way of example, and with reference to the accompanying figures, in which.

DETAILED DESCRIPTION

Figure 1:
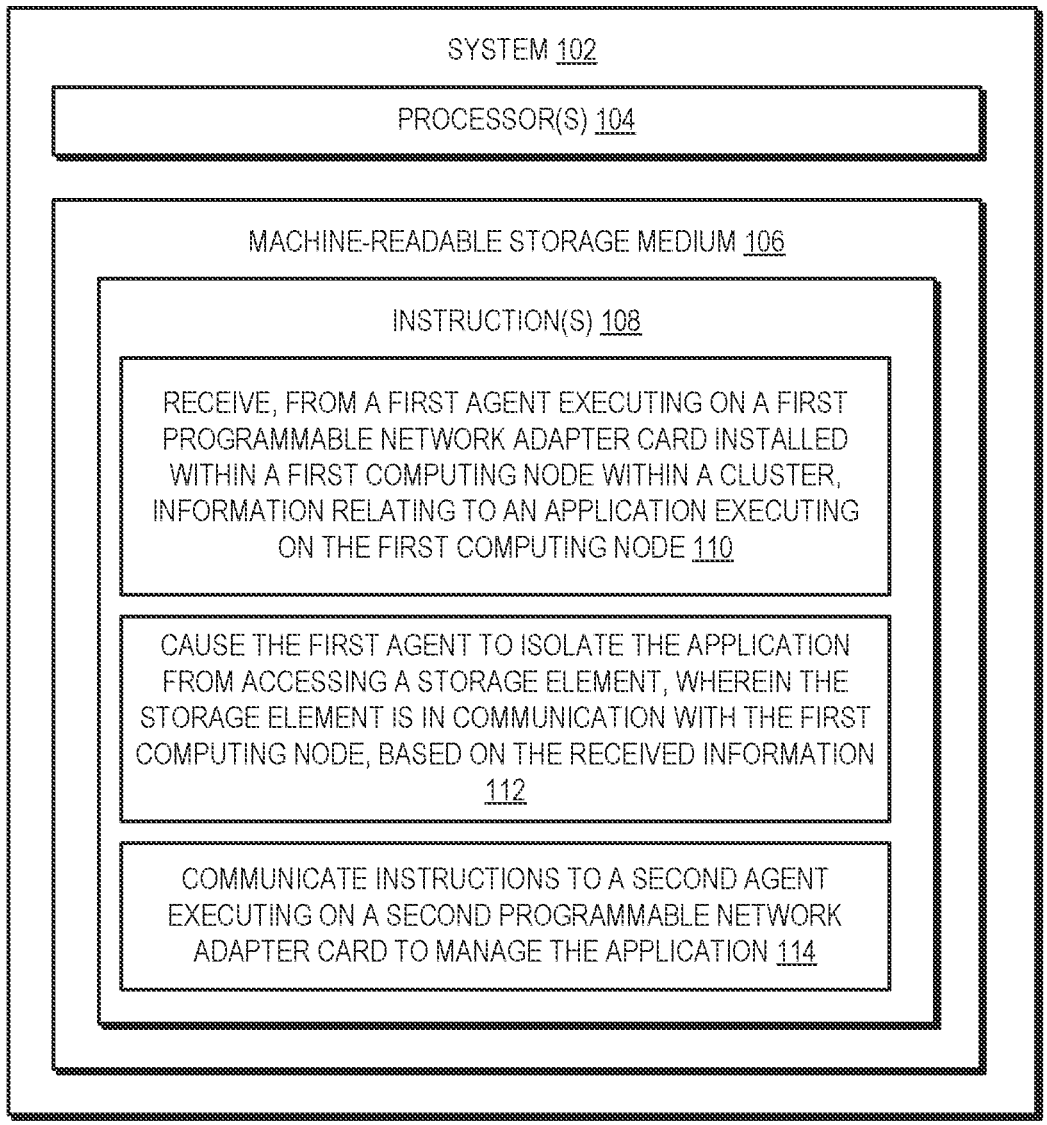
FIG. 1 illustrates a system for managing applications in a cluster, as per an example.

In cluster-based architecture systems, a set of computing nodes may be logically grouped together to form a computing cluster. Computational workload may be distributed between the computing nodes, which may be in communication with each other. The computing nodes may be physical servers or may be systems which in turn implement either a single server, one or more applications, multiple virtual machines, or different combinations thereof.

A computing node within the cluster may be configured to process requests that it may receive from another computing device and provide services to the requesting computing device. Services provided by the computing nodes may include providing access to data, implementing various operations, or a combination thereof. For example, the computing node may receive a request from a client device, process the request, and accordingly provide a response to the client device. For processing the request, the computing node may access a storage system, and retrieve and process data to provide the response. The computing node may also include different applications (either implemented on the computing node itself or implemented within a virtual environment running onto the computing node) that may access the storage system.

In addition to servicing requests received from other computing devices, the computing node may implement functions relating to management of life cycles of applications hosted therein. These include functions, such as initiating applications and monitoring their operation to assess whether the application (or the computing node) is functioning in a performant manner. The applications may be monitored to ensure that continuous operations or uptime state, as opposed to downtime state of the applications or the computing node, subsists for extended periods. The state of the cluster is referred to as high availability.

Enabling high availability involves monitoring, assessing, and minimizing instances of downtime to ensure continuous availability. In the event that a computing node is no longer available, e.g., no longer capable of servicing requests, a failover operation may be performed during which the applications executing on the failed node may be moved to other computing nodes. In these instances where an error occurs, ensuring high availability involves finding another computing node, for example, within the cluster in which the failed computing node is present, onto which servicing of subsequent requests may be transferred.

Various functions that may be utilized for ensuring high availability may be implemented by the operating system of a given computing node. In some cases, mechanisms for ensuring high availability may not be available at the hardware level of the different computing nodes. Furthermore, the computing nodes and storage systems may be used in different configurations to address different business considerations. Mechanisms for implementing high availability, if implemented at the operating system level, may not account for the applications which may be implemented within a given computing node. For example, the applications may be implemented to run over the operating system of the computing node or may be implemented within a virtualized environment. Such variations in the manner in which applications may be implemented, may pose challenges when using high availability mechanisms. As such, solutions for providing high availability which may be implemented at the platform level (i.e., at the computing node) are not available.

Irrespective of the manner in which such approaches are used, approaches for achieving high availability may load computational resources of the computing node which may impact servicing of requests by the computing nodes. Recent developments have resulted in computing nodes being installed programmable network adapter cards (which are also referred to as smart network interface cards). Such programmable network adapter cards not only provide interfaces to enable communication between computing nodes within a cluster-based computing environment, but also provide processing capacity for functions such as storage management and security functions. It is pertinent to note that such functions are implementable at the level of the computing nodes, independent from the operating systems.

Approaches for managing applications in a cluster-based computing environment, are described. In one example, the cluster may be implemented within a data centre comprising a plurality of computing nodes. In an example, the computing node may be a server implementing multiple applications. In another example, the computing node may be a server implementing multiple instances of virtual machines, the virtual machines further implementing respective applications. The computing node may be one of the nodes within a cluster. A cluster may be considered as a group of computing nodes each of which may be operational and functioning independent of each other. The resulting cluster may be considered as a unified computing resource for performing computational operations. Each of the computing nodes within the cluster may be coupled to a storage system to access and perform read-write operation on data stored in the storage system. The operation of the cluster may be monitored to assess occurrence of a failure and undertake remedial steps to ensure high availability.

The manner in which occurrence of a failure is assessed is described in the example context of a first computing node and a second computing node within a given a cluster. In an example, the first computing node may include a first programmable network adapter card (referred to as the first network card). In a similar manner, the second computing node includes a second network card. Examples of such programmable network adapter cards include smart network interface cards (or smart NICs) which may be installed within the computing nodes of a cluster. As would be discussed, assessing occurrence of a failure using the first network card and the second network card, which in turn may provide high availability, achieves a number of technical advantages. For example, utilizing the first network card and the second network card may offload the computational resources, e.g., the processor, of the computing node. In addition, assessment occurrence of failure by the first network card and the second network card at the level of the computing node is independent from the operating systems. Nor will such approaches may be impacted by the manner in which the applications are deployed on the computing node.

Both the first network card and the second network card may include processing resources which may be used for offloading certain processing functions from native processors of the respective first computing node and the second computing node. In an example, the first network card and the second network card may include a first agent and a second agent, respectively. As will be described further, the agents with the network cards will implement managing applications in a cluster, and thereby ensuring high availability.

In an example, the cluster may include a central assessment system which may be in communication with the first computing node and the second computing node. In an example, the central assessment system may receive information messages pertaining to the operation of the first computing node and the second computing node, from the first agent and the second agent. The information messages may pertain to certain operational or functional aspects of the first computing node and the second computing node. For example, the information may pertain to health information of the first computing node and the second computing node or may include information pertaining to applications that may be executing on the first computing node and the second computing node.

The information messages received from the respective agents of the first network card and the second network card may be processed to determine whether a failure has occurred in either the first computing node and the second computing node. For example, based on processing of data within the information messages, the central assessment system may ascertain that the first computing node (or one of the applications on the first computing node) is experiencing a failure, while the second computing node is operating in a performant manner. The determination may be based on a number of conditions which may be predefined. For example, the determination may be based on a change in frequency of messages, certain information included within the messages, or absence of any messages.

Once it is determined that the first computing node is experiencing a failure, the second agent within the second network card of the second computing node may be notified. Thereafter, the second agent within the second network card may cause the applications to be moved to the second computing node (e.g., perform a failover). In an example, the first agent may initially isolate the applications within the first computing node from the storage system, wherein once isolated, the application may be initialized to execute on the second computing node. As may be noted, by using resources associated with the first network card for monitoring applications and operations of the respective computing nodes, high availability is provided without burdening operating system of the computing nodes within the cluster. Moreover, the central assessment system within the cluster handles the failover locally, thereby rendering the failover process more efficient.

The above examples are further described in conjunction with appended figures. It should be noted that the description and figures merely illustrate the principles of the present subject matter. It will thus be appreciated that various arrangements that embody the principles of the present subject matter, although not explicitly described or shown herein, may be devised from the description, and are included within its scope. Moreover, all statements herein reciting principles, aspects, and examples of the present subject matter, as well as specific examples thereof, are intended to encompass equivalents thereof. In the figures, the left-most digit(s) of a reference number identifies the figure in which the reference number first appears. The same numbers are used throughout the figures to reference like features and components.

FIG. 1 illustrates a system 102 for assessing occurrence of failure in a computing node within a cluster (not shown in FIG. 1), as per an example. The system 102 includes processor(s) 104 and a machine-readable storage medium 106 coupled to and accessible by the processor(s) 104. The machine-readable storage medium 106 stores instruction(s) 108, that is accessible by the processor(s) 104. In an example, the system 102 may be implemented as a standalone computing device which may be in communication with computing nodes, such as a first computing node and a second computing node, within a cluster (not shown in FIG. 1). The processor(s) 104 may be implemented as a dedicated processor, a shared processor, or a plurality of individual processors, some of which may be shared.

The machine-readable storage medium 106 may be communicatively connected to the processor(s) 104. Among other capabilities, the processor(s) 104 may fetch and execute computer-readable instruction(s) 108, stored in the machine-readable storage medium 106. In operation, processor(s) 104 may execute the instructions 110 to obtain information from a first agent which is executing within a first network card. As used herein, the first agent (or other agents) may be implemented using programmable instructions. For example, such programmable instructions when executed may result in processes which may be used for performing various functions, such as networking, storage, and security functions. For example, the agents within the network cards may be used for monitoring operational parameters of the computing node within a cluster computing environment. In an example, the agents may be executed and controlled through a processing element of the respective network cards (e.g., the first network card).

The first network card in turn is installed within a first computing node within a cluster. The information that is obtained as a result of the execution of the instructions 110 may pertain to an application that may be executing in the first computing node and which may be communicatively coupled to a storage system. In an example, the information may pertain to the operation and health of the application executing in the first computing node.

Once the information is received by the system 102, the processor(s) 104 may execute instructions 112 to cause the first agent of the first network card to isolate the application from the storage system to which it is coupled. As used herein, "isolation" means to prevent the application from accessing the storage system (e.g., a LUN). A The isolation of the application from the storage system may be in response to processing the information about the application received from the first agent. In an example, isolation may limit the application which may be experiencing adverse operational conditions to access any storage system to which the first computing node may be in communication with. In other words, once the application is isolated, the isolated application may be unable to perform any read or write operations onto the storage system.

In an example, the system 102 may determine, based on processing the information, that first computing node is experiencing a failure. Based on determining the same, the instructions 112 may cause the first agent to isolate the application from the storage system. When isolated, the application or the first computing node may be restricted from accessing a storage system. In an example, the application or the first computing node may be restricted from accessing the network or any other services which were otherwise available to the first computing node prior to the isolation.

With the application isolated from the storage system, the processor(s) 104 may further execute instructions 114 to communicate instructions to a second agent. In an example, the second agent may be executing on a second network card installed within a second computing node within the cluster within which the first computing node may be present. In an example, the communicated instructions may be such that, when executed, may cause the second agent to manage the application. In an example, the second agent may initiate the application which may then begin running and operating on the second computing node.

Figure 2:
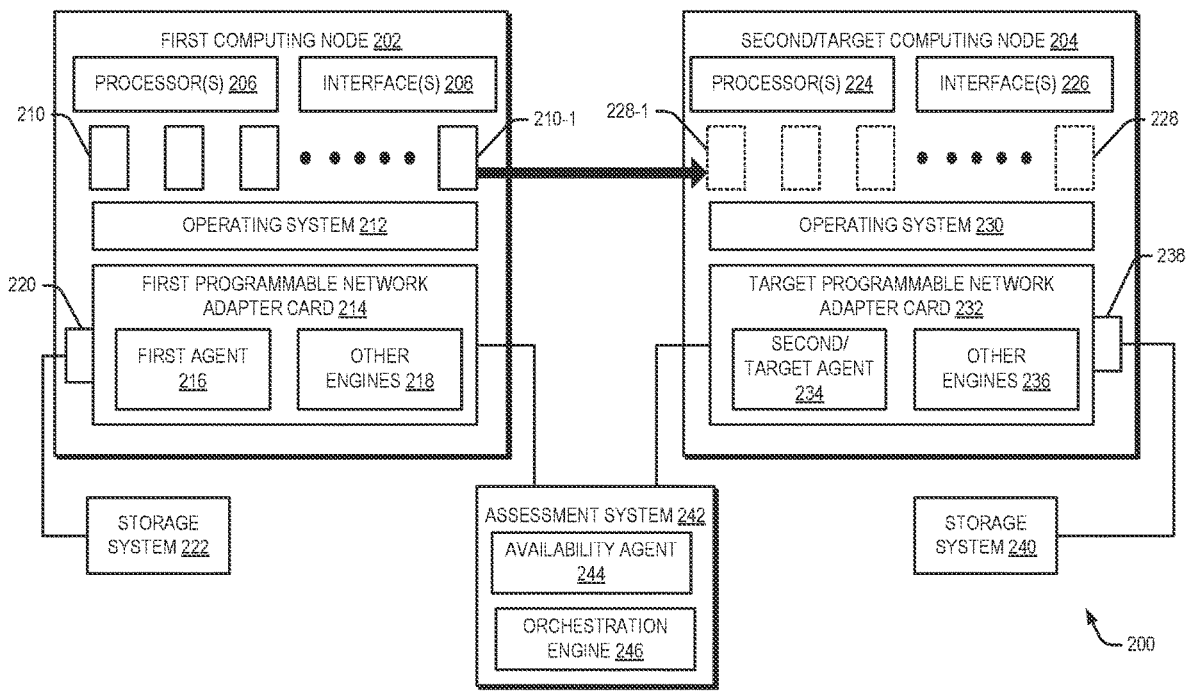
FIG. 2 illustrates a computing environment implementing a cluster, as per an example.

FIG. 2 illustrates a computing environment implementing a cluster 200. In an example, the cluster 200 may be implemented within a datacentre. As will be described, various approaches implemented within the cluster 200 will enable high availability in computing nodes within the cluster 200. In an example, the cluster 200 may include a first computing node 202 and a second computing node 204. The first computing node 202 may be implemented as a server device or a standalone computing system. The first computing node 202 may further include a processor 206 and an interface 208. In an example, the processor 206 is similar to the processor(s) 104 (as discussed in FIG. 1). The interface 208 may include software implemented interfaces as well as hardware implemented interfaces. The interface 208 enables the first computing node 202 to communicatively couple with other computing nodes within any given cluster. The interface 208 may further enable components of the first computing node 202 to communicate with each other. The first computing node 202 may further include applications 210-1, 2, . . . , N. The applications 210-1, 2, . . . , N (collectively referred to as the applications 210) may execute on the first computing node 202. The execution of any one or combination of more applications 210 may implement various services within the cluster 200. In an example, the applications 210 may be executing over an operating system 212.

It may be noted that the applications 210 may be running in the first computing node 202 in different combinations. For example, the applications 210 may be implemented and executing within a virtual environment (e.g., within a virtual machine). In this case, a virtual machine may be running a single or multiple application, or in other cases multiple virtual machines may be running single or multiple applications. In other examples, the applications 210 may be deployed in containers or may be installed on the operating system (such as the operating system 212) of the first computing node 202.

Within the first computing node 202, a programmable network adapter card 214 in installed. An example of a programmable network adapter card 214 includes a smart network interface card (NIC). Network cards, such as the programmable network adapter card 214, enable computing devices to communicate and be coupled with other computing devices, or network devices within a network. In certain instances, the network cards may also enable computing device to be communicatively coupled to another network. The programmable network adapter card 214 differs from the network cards by implementing additional computational, networking, storage, and security functions through processing elements provided therein, instead of a host processor of a computing device. For example, the programmable network adapter card 214 (referred to as the first network card 214) may include processing elements which may implement certain functions instead of the processor 206. These functions may be implemented either by way of circuitry or through software-defined logic.

In an example, the first network card 214 may include controllers (for enabling networking functions), a processor unit, and interfaces which may enable communicatively coupling the first computing node 202 with other computing nodes or with other types of devices, such as a storage system. The first network card 214 may also include additional components that may enhance certain computational features such as processing capability or storage, of the first network card 214.

The first network card 214 may further include a first agent 216 as well as other engines 218. The first agent 216, as described later, will monitor health of applications which may be executing on the first computing node 202. The other engines 218 may be utilized for performing other functions by the first network card 214. Examples of such functions may include functions to physical devices or may include functions pertaining to other functional features of the first computing node 202. These features may include functions pertaining to networking, security, and availability. To this end, the other engines 218 may implement a set of physical functions (PF) or virtual functions (VF). The physical functions (PFs) refer to the physical device (such as the first network card or the second network card) whereas the virtual functions (VFs) refer to virtual instances of the PF or the device. In this manner, the physical device may appear and be available as multiple virtual instances or virtual functions. In an example, PFs may be considered as providing access and control of certain core functions, say of the first network card 214 and the second network card 232. The PFs may be implemented through drivers which in turn may be required for interfacing with the network cards. On the other hand, the VFs may, amongst other things, enable transmission of data or information between the network cards and the applications which may be executing on any given computing node. For example, a VF may be associated with one of the applications 210 and may manage communication of the data of the applications with storage system 222.

The first agent 216 and the other engines 218 (collectively referred to as engines) may be implemented as a combination of hardware and programming, for example, programmable instructions to implement a variety of functionalities. In examples described herein, combinations of hardware and programming may be implemented in several different ways. For example, the programming for the engines may be executable instructions. These instructions may be stored on a non-transitory machine-readable storage medium which may be coupled either directly with the first computing node 202 or indirectly (for example, through networked means). In an example, the engines may include a processing resource, for example, either a single processor or a combination of multiple processors, to execute the instructions. In the present examples, the non-transitory machine-readable storage medium may store instructions, such as instructions 208, that when executed by the processing resource, implement the engines. In other examples, the engines may be implemented as electronic circuitry. The first computing node 202 may further include a port 220 through which the first computing node 202 may be coupled to a storage system 222. Examples of the storage system 222 may include, but are not limited to, a physical storage such as a hard disk, a virtual storage such as a distributed file system, and a logical unit number (LUN).

The second computing node 204 may include components which are similar to the components of the first computing node 202. For example, the second computing node 204 may include a processor 224 and interface 226. The second computing node 204 may further include applications 228 which may be similar to the applications 210, with the applications 228 running over the operating system 230. Continuing further, the second computing node 204 may include second network card 232. The second network card 232, similar to the first network card 214, may be a smart new interface card. The second network card 232 further includes a second agent 234 and other engines 236. The second agent 234 and the other engines may be similar to the engines (e.g., the first network card 214 and the other engine 218 in the first computing node 202). In an example, the second computing node 204 may include a port 238 connecting the second computing node 204 to a storage system 240.

As discussed previously, the first computing node 202 and the second computing node 204 are part of the cluster 200. The cluster 200 thus formed may operate as a unified computing resource to implement services through a combined operation of the first computing node 202 and the second computing node 204. Although not depicted, the cluster 200 may include other computing nodes (not shown in FIG. 2). Even in these instances, the approaches may be implemented for such other computing nodes without deviating from the scope of the present subject matter.

Continuing further, the first computing node 202 and the second computing node 204 may be both communicatively coupled to a central assessment system 242. In an example, the central assessment system 242 (referred to as the assessment system 242) may be similar to the system 102 (as described in FIG. 1). The assessment system 242 may further include an availability agent 244. As will be described, the availability agent 244 may further assist in providing services with high availability through the computing nodes, such as the first computing node 202 and the second computing node 204. In an example, the assessment system 242 may be coupled to the first computing node 202 and the second computing node 204 through a network. The network may be a private network or a public network and may be implemented as a wired network, a wireless network, or a combination of a wired and wireless network. The network may also include a collection of individual networks, interconnected with each other and functioning as a single large network, such as the Internet. Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), Long Term Evolution (LTE), and Integrated Services Digital Network (ISDN).

Figure 3:
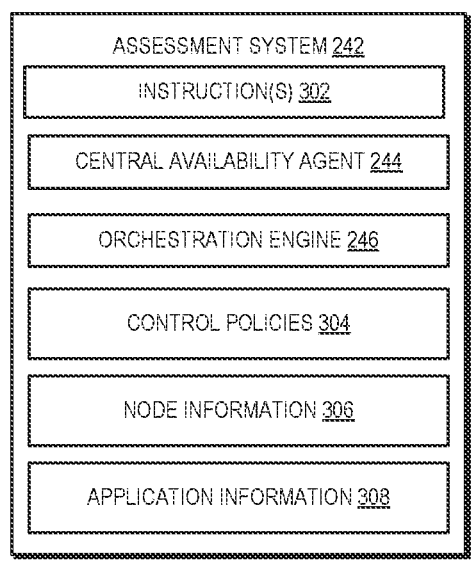
FIG. 3 illustrates an assessment system for managing applications in a cluster, as per an example.

The operation of the assessment system 242 is further described in conjunction with FIG. 3. FIG. 3 depicts various components of an example assessment system 242. The assessment system 242, as depicted in FIG. 3, includes the central availability agent 244. In addition, the assessment system 242 may include instruction(s) 302. In an example, the instruction(s) 302 may be fetched from a memory of the assessment system 242 and executed by its processor to invoke the availability agent 244. The assessment system 242 may further include control policies 304, node information 306, and application information 308.

Returning to the example cluster 200 as depicted in FIG. 2, the applications 210 may be executing and running on the first computing node 202 to provide services. As they run, they may be accessing the storage systems 222 for performing read-write operations on the data stored in the storage systems 222. In an example, the first network card 214 may initialize the first agent 216. The initialization of the first agent 216 may be based on control policies 304. For example, the control policies 304 may specify what monitoring functions are to be implemented by the first agent 216. In addition, the control policies 304 may also specify which of the applications 210 are to be monitored and what parameters of the applications 210 are to be monitored. In an example, the control policies 304 may be prescribed through the assessment system 242. In a similar manner, the assessment system 242 may also prescribe other control policies 304 for the second agent, such as the agent 234 within second computing node 204. The control policies 304 may be prescribed for the applications 210, or for the virtual instances within which the applications 210 may be running. In another example, the control policies 304 may also be prescribed for container environments within which he applications 210 may be implemented.

Once the first agent 216 and the second agent 234 are initialized, they may transmit their identification information to the assessment system 242. The identification information may be utilized by the assessment system 242 for discovering and identifying the different computing nodes which may be present within the cluster, say the cluster 200. In the present example, based on the identification information received from the first agent 216 and the second agent 234, the assessment system 242 may determine that first computing node 202 and the second computing node 204 are present within the cluster 200. In an example, the information identifying different computing nodes, i.e., the first computing node 202 and the second computing node 204, may be stored in node information 306. It may be noted that although the present example is described with respect to the first computing node 202 and the second computing node 204, the process of discovery and identification as described may be applied for any number of computing nodes which may be present within the cluster 200. In an example, the instruction(s) 302 may be executed to initialize the first agent 216 and the second agent 234.

With the first agent 216 now initialized, it may now gather information pertaining to the applications 210. In an example, the first agent 216 may gather the information by interfacing with the application layer through the other engines 218. The information from the applications 210 may be gathered at predefined intervals. The intervals in turn may be prescribed through the control policies 304.

Once the information is gathered from the applications 210, the first agent 216 may transmit the information as messages to the assessment system 242. The information messages received by the assessment system 242 may then be stored as the application information 308. In an example, the information messages may provide a variety of information pertaining to the first computing node 202 (or any other computing node within the cluster 200). Examples of such information include, but is not limited to, identity of the first computing node 202, information pertaining to the applications 210, information about computational resources of the first computing node 202, and health and operational parameters of the first computing node 202. In another example, the information message may be a heartbeat message generated and transmitted by the first computing node 202. In a similar manner, the second computing node 204 may also generate such heartbeat messages for transmitting to other computing nodes within the cluster 200. The heartbeat messages may be considered as message that may be periodically shared between various computing nodes in the cluster 200.

The availability agent 244 within the assessment system 242 may then determine whether the computing node under consideration (e.g., the first computing node 202) is experiencing any issues. To this end, the availability agent 244 may monitor the first computing node 202 and its applications 210 in two phases. In the first phase, the availability agent 244 may determine a periodicity or pre-defined time periods with which the first agent 216 is transmitting the information messages. Periodicity may be considered as a regular time interval within which the information messages may be transmitted. For example, if the periodicity is x seconds, then the first agent 216 may transmit an information messages every x seconds.

The periodicity that the first agent 216 is to follow for transmission of information messages, may in turn be specified through the control policies 304. It may be noted that any additional or unplanned loading or issues may result in congestion at the first computing node 202. If these instances occur, it is likely that the periodicity of the incoming information messages may increase. On the other hand, if the first computing node 202 is operating in a performant manner, the periodicity of the incoming messages may remain consistent with the periodicity that may have been specified through the control policies 304.

The availability agent 244 may continue to recursively monitor the periodicity of the incoming message. If the periodicity of the message information increases beyond a certain threshold limit, the availability agent 244 may ascertain that the first computing node 202 may be experiencing conditions which may correspond to onset of increased loading or occurrence of an error. For example, an increase in the time interval between each successive information messages may indicate a number of conditions, namely, application crashing, the agent crashing, or in instances involving virtual machines, the virtual machine itself crashing. In any case, any delay in receiving the information messages or failure in receiving the information messages may be attributed to any one or more of the applications 210 being rendered inactive.

To this end, the availability agent 244 may compare the periodicity of the incoming message information and compare the same with the periodicity prescribed under the control policies 304. On determining that the periodicity has increased to a value which is greater than a predefined threshold, the instruction(s) 302 may execute to further cause the availability agent 244 to process the application information 308 (which in turn was derived based on the incoming information messages). In an example, the availability agent 244 may process application information 308 to determine various operational parameters pertaining to the applications 210 and the first computing node 202. The operational parameters determined from the application information 308 may then be compared with predefined values or thresholds to determine whether the given node, i.e., the first computing node 202 is unavailable. Accordingly, the availability agent 244 may determine whether to implement remedial procedures, which includes, failover to ensure high availability.

It may be noted that probable candidate computing nodes onto which the failover may be performed, may be determined based on information messages shared by the respective computing nodes. In the context of the present example, the second agent 234 within the second computing node 204 may periodically communicate information messages to the availability agent 244 within the assessment system 242. The availability agent 244 may then determine the operational health of the second computing node 204. If found to be acceptable, the orchestration engine 246 may initiate the failover process and move the applications 210 to the second computing node 204. In an example, the availability agent 244 may communicate with the orchestration engine 246 to determine which one of the first computing node 202 and the second computing node 204 may be suitable for failover of the applications.

As discussed above, the second computing node 204 may communicate their information messages to the assessment system 242. In a similar manner, other computing nodes (not shown in FIG. 2) may also communicate their respective information messages to the availability agent 244 of the assessment system 242. The availability agent 244 may evaluate the operational state of the other nodes (e.g., the second computing node 204) to determine one of the computing nodes as a candidate computing node to which the applications 210 may be moved.

In an example, one of the agents executing on respective programmable network adapter cards may be elected as a coordinator agent. The election of a given computing node as a coordinator agent may be based on a number of conditions. For example, it may depend on the computational attributes of the programmable network adapter card onto which a given agent may be executing. In this case, the different agents may initially share information messages amongst themselves. In an example, the information messages may include an identification message. The identification message, amongst other things, may provide an identifier corresponding to the first network card 214. In another example, the identification message may also indicate information pertaining to the computational resources of the first network card 214.

Once the information is exchanged, it may be processed to identify the agent executing on a programmable network adapter card with maximum computational resource. The identified agent may then be elected or designated as a coordinator agent. Once appointed, the elected coordinator agent may gather the information messages from other agents in other computing nodes and transmit the same to an availability agent, such as the availability agent 244 running on the assessment system 242. As may be understood, the assessment system 242 may therefore receive information messages from other agents or may receive information messages of other computing nodes through the coordinator agent. The coordinator agent with other agents may be clubbed together to form a sub-cluster. In another example, multiple other agents in other computing nodes may be designated as coordinator agents. The other coordinator agents may be clubbed with a set of other agents to form other sub-clusters. In these examples, the different agents may be organized into multiple groups with each group having respective elected coordinator agents, with the elected coordinator agents then communicating information messages to the central assessment system, such as the assessment system 242. These and other examples would still fall within the scope of the present subject matter.

As discussed previously, the orchestration engine 246 may enable failover to a different node (referred to as a target node) on determining that a given computing node is experiencing a failure or error. In the example explained above, the first computing node 202 was described as experiencing a failure based on the application information 308 that were processed by the availability agent 244. For the purposes of explanation, the present example is described assuming that the second computing node 204 was determined to be a suitable candidate for failover in the event of the first computing node 202 no longer being available.

Once the second computing node 204 is identified (i.e., target node 204), the orchestration engine 246 may initialize isolation of the first computing node 202 from the corresponding storage system 222. To this end, the orchestration engine 246 may transmit instructions to the first agent 216 to isolate any one of the applications 210, say application 210-1 which is determined to be operating improperly, from accessing the storage system 222. In an example, the first agent 216 running on the first network card 214 may isolate the application 210-1 from accessing any other service or devices which may be in communication with the first computing node 202. In this case, the other engines 218 implementing a plurality of virtual functions (VFs) may be controlled and managed by the first agent 216. The first agent 216 may terminate the VFs managing access to the storage system 222. Once the VF is terminated, the access to the storage system 222 is lost thereby resulting in the isolation of the application 210-1 from the storage system 222. In case the applications 210 are implemented in a virtual machine or a container, the virtual machine or the containing may cease to have access to the network to which the first computing node 202 may be connected with. In an example, the virtual machine or the container (as the case may be) may cease to be in communication with the storage system 222. The storage system 222 may be managing a storage LUN being implemented on the first computing node 202. It may be noted that other approaches for isolating either the application 210-1 or the first computing node 202 may be adopted without deviating from the scope of the present subject matter. In an example, the execution of the application 210-1 may be terminated.

Once the application 210-1 is isolated, configuration information pertaining to the isolated application 210-1 may be retrieved. In an example, the configuration information may be obtained from the application information 308. The configuration information of the application 210-1 may define various parameters based on which the application 210-1 initially accessed either the storage system 222, services, or other devices within the cluster 200. Examples of such configuration information include, but are not limited to, network configurations, port numbers, and such.

The orchestration engine 246 may then use the configuration information thus gathered for preparing network connections to other storage systems, services or other devices. Once the network connections and other configurations are defined, the orchestration engine 246 may commence with the initiation of the application 210-1, but on the target computing node 204. In an example, the orchestration engine 246 may send initiation instructions to the second agent 234 (now referred to as the target agent 234). The target agent 234 on receiving the instructions from the orchestration engine 246 of the assessment system 242, may initialize or start the application 210-1 (as application 228-1). The application 228-1 may then commence to access storage systems, services or other devices based on the configuration information. For example, the application 228-1 when it executed, may now access the storage system 240 through port 238.

The first agent 216 may take proactive measures for ensuring availability of the first computing node 202. As discussed earlier, the first agent 216 may periodically transmit information messages to the availability agent 244 of the assessment system 242. The availability agent 244 may generate acknowledgment messages and transmit them in response to the information messages received from the first agent 216. Since the acknowledgment messages are generated in response to the information messages, the periodicity of the acknowledgment messages would correspond to the periodicity of the information messages. In an example, the first agent 216 may monitor any change in the periodicity of the acknowledgment messages received from the availability agent 244. In the event that the periodicity, i.e., the time interval between successive incoming acknowledgment messages increases, the first agent 216 may determine that first computing node 202 may be experiencing congestion owing to which, a delay between successive acknowledgment messages may have arisen. Accordingly, absence of any acknowledgment messages may indicate that the first computing node 202 may have become non-operational and is no longer in communication the assessment system 242.

On detecting the situations as discussed above, the first agent 216 may initiate isolation of the first computing node 202. To this end, the first agent 216 may initiate termination of one of the applications, say the application 210-1, which is not functioning properly or has experienced a failure. Once the execution is terminated, the application 210-1 also severs any communication with the first network card 214 within the first computing node 202. Once communication with the first network card 214 has ended, the application 210-1 may no longer be capable of accessing any network, storage system (e.g., the storage system 222), or any other device. In an example, the availability agent 244 may also be undertaking additional steps to implement a failover to an appropriate computing node, such as the second computing node 204. It may be noted that isolation initiated by the first agent 216 may prevent any access attempts by the application 210-1, while the availability agent 244 may be implementing a failover action to move the application 210-1 to the second computing node 204. In an example, the application 210-1 may be initiated or started on the second computing node 204 as the application 228-1. Within the second computing node 204, the second agent 234 may, on detecting the application 228-1, may communicate the same to the assessment system 242. In an example, on receiving an intimation that the application 210-1 (now application 228-1) has moved to the second computing node 204, the availability agent 244 may purge records and configuration information pertaining the application 210-1 when it was running on first computing node 202.

In an example, a failure may be ascertained in instances where there is disruption in communication between various agents and a coordinator agent. For the purposes of explaining the present example, the second agent 234 is assumed to be the coordinator agent. During performant operation of the first computing node 202 and the second computing node 204, the second agent 234 (acting as a coordinator agent) may collect information messages from the first agent 216 and communicate the same to the assessment system 242. In case the first computing node 202 is experiencing an error, it may result in the first agent 216 failing to share the information messages of the first computing node 202 to the second agent 234. The second agent 234 may thereafter communicate the absence of any incoming information messages to the availability agent 244 of assessment system 242. The availability agent 244 may thereafter either send instructions to the first agent 216 to isolate the application or the first computing node 202. In addition, the availability agent 244 may also send instructions to the second agent 234 for initiating a failover of the applications 210 on the first computing node 202 to the second computing node 204.

As described above, the first network card 214 and the second network card 232 may be utilized for implementing high availability of the various applications that may be running thereupon. As also described previously, the first network card 214 and the second network card 232 may communicate with applications through drivers which may be installed onto the operating systems 212, 230. In the case of virtual machines or containers, the first network card 214 and the second network card 232 may communicate with the applications 210 through protocols based on the single root input/output virtualization (SR-IOV) specification. It may be noted that the SR-IOV specification is only one example— other examples are also possible without deviating from the scope of the present subject matter.

Figure 4:
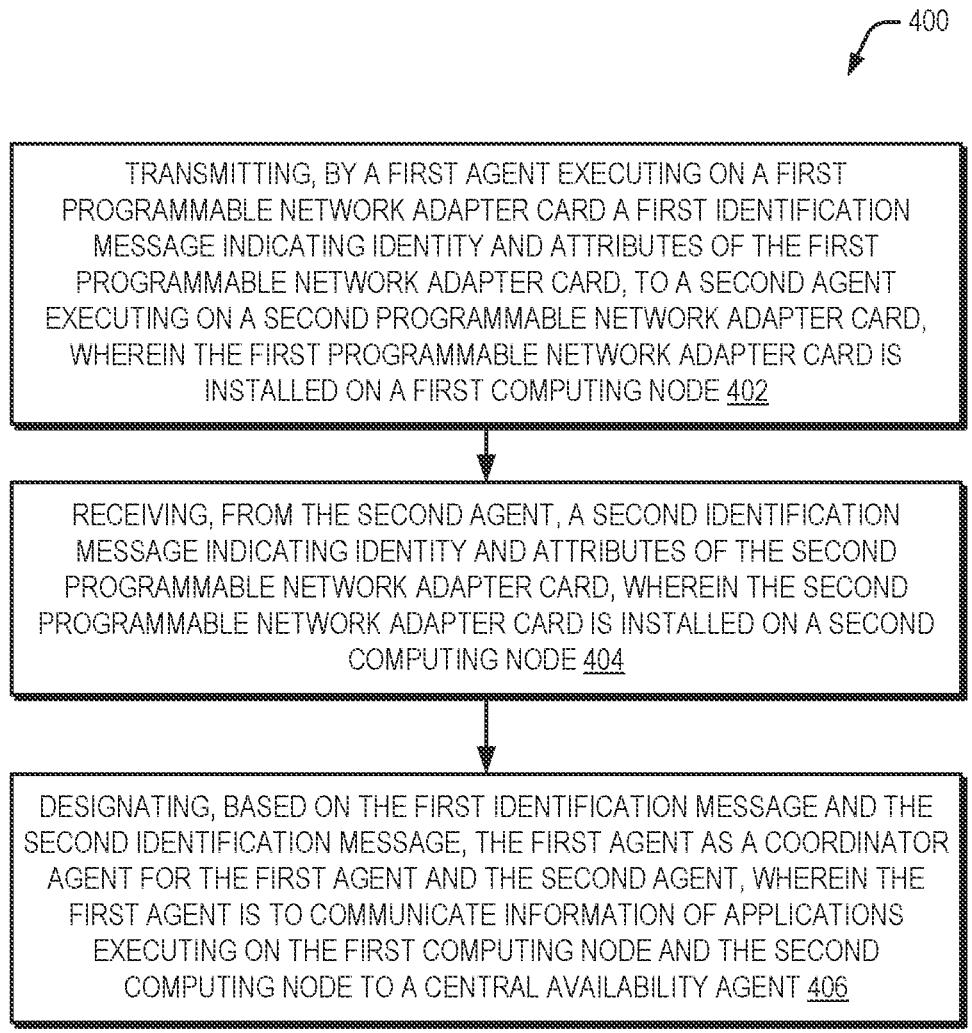
FIG. 4 illustrates a method for managing applications in a cluster, as per an example.

FIG. 4 illustrates a method 400 for handling failover in a distributed computing system, as per another example. The order in which the above-mentioned methods are described is not intended to be construed as a limitation, and some of the described method blocks may be combined in a different order to implement the methods, or alternative methods. Furthermore, the above-mentioned methods may be implemented in any suitable hardware, computer-readable instructions, or combination thereof. The steps of these methods may be performed by either a system under the instruction of machine executable instructions stored on a non-transitory computer readable medium or by dedicated hardware circuits, microcontrollers, or logic circuits. For example, the method 400 may be performed by the first agent 216 executing on a first network card 214 installed within a first computing node 202. Herein, some examples are also intended to cover non-transitory computer readable medium, for example, digital data storage media, which are computer readable and encode computer-executable instructions, where said instructions perform some or all of the steps of the above-mentioned method.

At block 402, a first identification message indicating identity and attributes of a first programmable network adapter card may be transmitted by a first agent. The first agent may be executing on the first programmable network adapter card, wherein the network card is installed on a first computing node. For example, the first agent 216 may transmit a first identification message to the second agent 234 executing in the second network card 232 of the second computing node 204. The first identification message may provide an identifier as well as computational attributes of the first network card 214. The identification messages are shared with the second agent 234 executing within the second network card 232.

At block 404, similar to the first identification, a second identification may be received from the second agent. For example, the first agent 216 receive transmit a second identification message from the second agent 234 of the second computing node 204. The second identification message, similar to the first identification message, may provide an identifier as well as computational attributes of the second network card 232.

At block 406, one of the first agent and the second agent may be designated as a coordinator agent based on the first identification message and the second identification message. Once one of the computing nodes is designated as a coordinator agent, the coordinator node may thereafter obtain information messages from other agents executing on other network cards within a cluster. For example, based on comparison of computational resources of first network card 214 and the second network card 232, the first agent 216 may be designated as a coordinator agent. Once designated as a coordinator agent, the first agent 216 may gather information messages from other agents (such as the second agent 234) and transmit the gathered information messages to the availability agent 244 of the assessment system 242.

Figure 5:
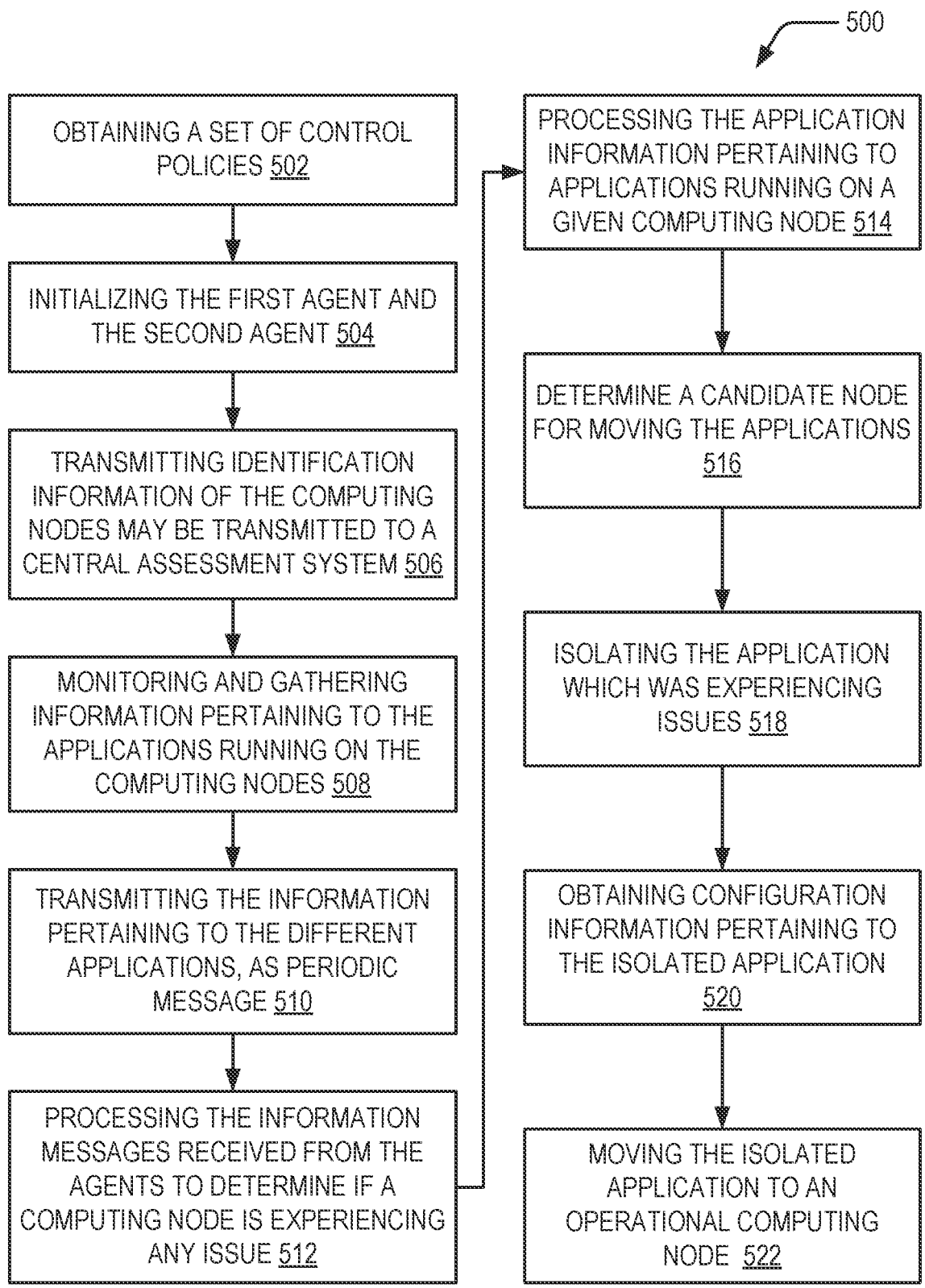
FIGS. 5-6 illustrates example methods for managing applications in a cluster.

FIG. 5 illustrates a method 500 for handling failover in a distributed computing system, as per another example. Similar to the method 400, the method 500 may also be implemented through one of the first computing node 202, second computing node 204, and the assessment system 242. As discussed above, the first computing node 202 includes a first network card 214 which runs a first agent 216. In a similar manner, the second computing node 204 may include the second network card 232 which runs the second agent 234. Although depicted as comprising only two computing nodes, the cluster 200 may include additional computing nodes without deviating from the scope of the present subject matter.

At block 502, a set of control policies may be obtained. For example, the control policies 304 may be obtained from the assessment system 242. The control policies 304 may specify what monitoring functions are to be implemented by the agents, such as the first agent 216, within the various programmable network adapter card. In addition, the control policies 304 may also specify which of the applications 210 (running on the first computing node 202) are to be monitored and what parameters of the applications 210 are to be monitored. In a similar manner, the assessment system 242 may also prescribe other control policies 304 for the second agent, such as the agent 234 within second computing node 204. The control policies 304 may be prescribed for the applications 210, or for the virtual instances within which the applications 210 may be running. In another example, the control policies 304 may also be prescribed for container environments within which he applications 210 may be implemented.

At block 504, the first agent and the second agent may be initialized. For example, the first agent 216 and the second agent 234 may be initialized by the first network card 214 and the second network card 232, respectively. In the context of the present example, the first agent 216 may be implemented within a first network card 214, with the first network card 214 being implemented within the first computing node 202. In a similar manner, the second agent 234 may be also be initialized with the second agent 234 being implemented on the second network card 232 installed within the second computing node 204. The first computing node 202 and the second computing node 204 may be the computing nodes within the cluster 200. The first computing node 202 may applications 210 to provide services. As they run, they may be accessing the storage systems 222 for performing read-write operations on the data stored in the storage systems 222. In an example, the first agent 216 and the second agent 234, once initialized, may commence monitoring the operation of the first computing node 202 and the second computing node 204 in accordance with the control policies 304.

At block 506, identification information of the computing nodes may be transmitted to a central assessment system. The central assessment system may be in communication with the different computing nodes within a cluster. For example, the first agent 216 and the second agent 234 may transmit identification information of the first computing node 202 and the second computing node 204, to the assessment system 242. Based on the identification information, the assessment system 242 may determine that first computing node 202 and the second computing node 204 are present within the cluster 200. In an example, the information identifying the first computing node 202 and the second computing node 204, may be stored in node information 306.

At block 508, the agents may monitor and gather information pertaining to the applications running on the computing nodes. For example, the first agent 216 gathers information pertaining to the applications 210. In an example, the first agent 216 may gather the information by interfacing with the application layer through the other engines 218. The information from the applications 210 may be gathered at predefined intervals. The intervals in turn may be prescribed through the control policies 304.

At block 510, the information pertaining to the different applications is transmitted to the assessment system, as periodic message. For example, the first agent 216 may transmit the information as messages to the assessment system 242. The information messages may be transmitted at a predefined periodicity, i.e., with each successive information messages being transmitted after a fixed time interval. The information messages received by the assessment system 242 may then be stored as the application information 308. In an example, the information messages may be shared by the first agent 216 and the second agent 234, wherein the first agent 216 and the second agent 234 share the information about their respective computing nodes, such as the first computing node 202 and the second computing node 204. In an example, one of the agents, say first agent 216 may be elected as a coordinator node. Thereafter, the first agent 216 may then collect information messages from the second agent 234 and transmit the same to the assessment system 242. In an example, the availability agent 244 of the assessment system 242 may communicate with the orchestration engine 246 to determine which one of the first computing node 202 and the second computing node 204 are suitable for the failover of the application 210-1 (or any other applications 210 which may be experiencing a failure).

At block 512, the information messages received from the agents may be processed to determine if a computing node is experiencing any issue. For example, the availability agent 244 may process the information messages to determine whether, say the first computing node 202, is experiencing any issues. The availability agent 244 may initially determine whether the periodicity of the incoming information messages has changed. For example, any additional or unplanned loading or issues may result in congestion at the first computing node 202 owing to which the first computing node 202 may end up transmitting the information messages less frequently. The availability agent 244 may continue to monitor the periodicity of the incoming message. If the periodicity of the message information increases beyond a certain threshold limit, the availability agent 244 may ascertain that the first computing node 202 may be experiencing conditions which may correspond to onset of increased loading or occurrence of an error.

At block 514, the application information pertaining to applications running on a given computing node may be processed. For example, the availability agent 244 may process the application information 308 (which in turn was derived based on the incoming information messages) to determine operational parameters pertaining to the applications 210 and the first computing node 202. The operational parameters determined from the application information 308 may then be compared with predefined values or thresholds to determine whether the given node, i.e., the first computing node 202 is unavailable.

At block 516, a candidate node for moving the applications may be determined. For example, based on the information messages received information messages from the second agent 234, the availability agent 244 may determine the operational health of the second computing node 204 (or any other computing node within the cluster 200). To this end, the availability agent 244 may process the node information 306 and the application information 308 to determine the computational resources of the second computing node 204 and assess whether the aforesaid computational resources would be capable of supporting the applications 210. If found to be acceptable, the orchestration engine 246 may initiate the failover process and move the applications 210 to the second computing node 204.

At block 518, the application which was experiencing issues may be isolated. For example, the orchestration engine 246 may initialize isolation of the first computing node 202 from the corresponding storage system 222. To this end, the orchestration engine 246 may isolate application 210-1 from accessing the storage system 222. In an example, the application 210-1 may also be isolated from accessing any other service or devices which may be in communication with the first computing node 202. In an example, the execution of the application 210-1 may be terminated.

At block 520, configuration information pertaining to the isolated application may be obtained. For example, once the application 210-1 is isolated, the availability agent 244 may retrieve the configuration information pertaining to the isolated application 210-1 from the application information 308. The configuration information may describe various parameters based on which the application 210-1 initially accessed either the storage system 222, services, or other devices within the cluster 200. Examples of such configuration information include, but are not limited to, network configurations, port numbers, and such. The orchestration engine 246 may then use the configuration information thus gathered for preparing network connections to other storage systems, services, or other devices.

At block 522, the isolated application may be moved to an operational computing node. For example, once the network connections and other configurations are defined for the applications 210, the orchestration engine 246 may commence with the initiation of the application 210-1, but on the target computing node 204. In an example, the orchestration engine 246 may send initiation instructions to the second agent 234 (now referred to as the target agent 234). The target agent 234 on receiving the instructions from the orchestration engine 246 of the assessment system 242, may initialize or start the application 210-1 (as application 228-1). The application 228-1 may then commence to access storage systems, services or other devices based on the configuration information. For example, the application 228-1 when it executed, may now access the storage system 240 through port 238.

Figure 6:
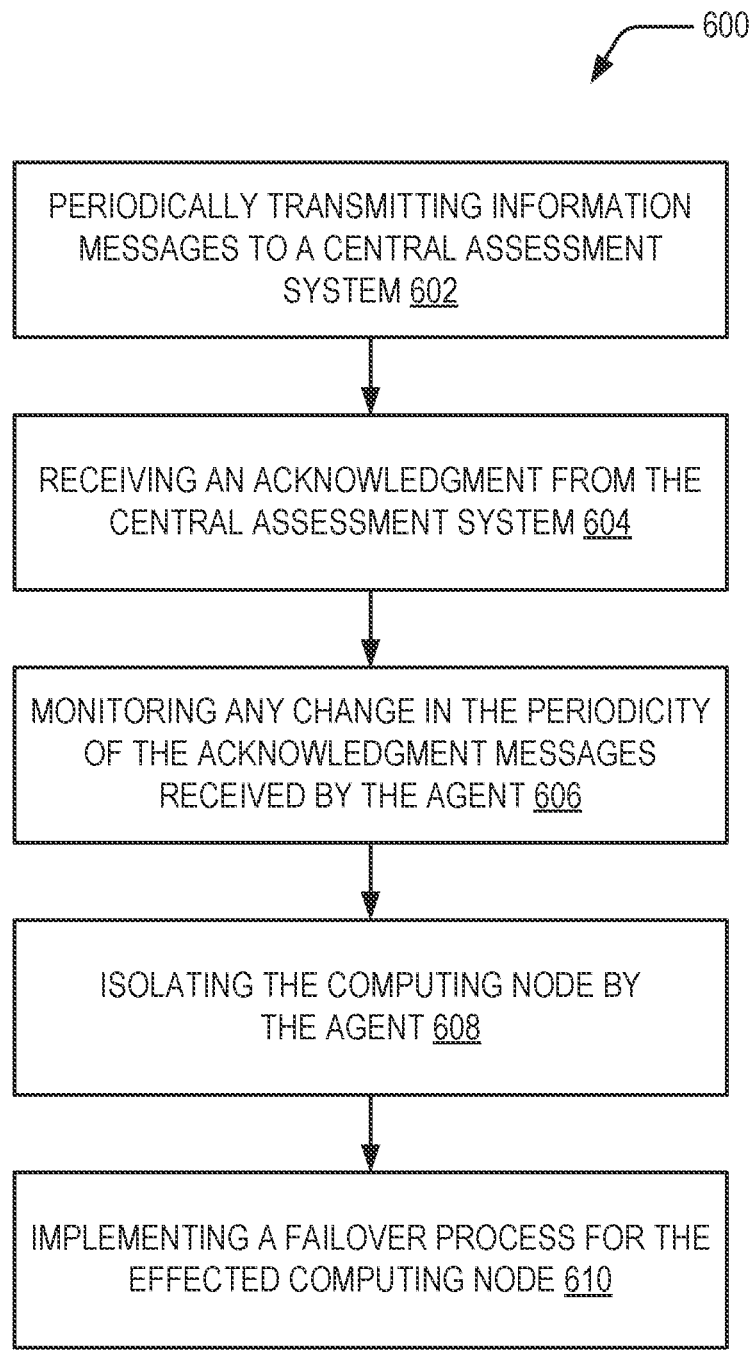

FIG. 6 illustrates a method 600 which may be implemented by an agent on detecting issues with the computing node on which it may be operating. The method 600 may also be implemented through one of agents, say the first agent 216 operating on the first network card 214 of the first computing node 202. To this end, the first agent 216 may take proactive measures for ensuring availability of the first computing node 202.

At block 602, an agent may periodically transmit to information messages to a central assessment system. For example, the first agent 216 may periodically transmit information messages to the availability agent 244 of the assessment system 242. The information messages may provide information pertaining to the applications 210 which may be executing on the first computing node 202. This may include information as to the extent of computational resources being utilized by any of the applications 210, and such other information.

At block 604, an acknowledgment may be received from the central assessment system. For example, the availability agent 244 may generate acknowledgment messages and transmit them in response to the information messages received from the first agent 216. In an example, the acknowledgment messages are generated at the periodicity as that of the information messages.

At block 606, the agent may monitor any change in the periodicity of the acknowledgment messages received by the agent. For example, the first agent 216 may monitor any change in the periodicity of the acknowledgment messages received from the availability agent 244. In the event that the periodicity increases, the first agent 216 may conclude that first computing node 202 may be experiencing congestion owing to which, a delay between successive acknowledgment messages is occurring. Accordingly, absence of any acknowledgment messages may indicate that the first computing node 202 may have become non-operational and is no longer in communication the assessment system 242.

At block 608, the agent may isolate the computing node. For example, the first agent 216 may initiate isolation of the first computing node 202 on determining that either the periodicity of the acknowledgment messages from the assessment system 242 has increased or in case where the acknowledgment messages have stopped. The first agent 216 may then initiate termination of one of the applications, say the application 210-1, which is not functioning properly or has experienced a failure. Once the execution is terminated, the first agent 216 may sever any communication of the applications 210 with the first network card 214 within the first computing node 202. Once communication with the first network card 214 has ended, the application 210-1 may no longer be capable of accessing any network, storage system (e.g., the storage system 222), or any other device.

At block 610, failover process for the effected computing node may be undertaken. For example, once the application 210-1 has been isolated from accessing storage system 222, devices, or other services, the availability agent 244 may determine a candidate computing node, such as the second computing node 204 and initiate the failover of the application 210-1 to the second computing node 204.

Figure 7:
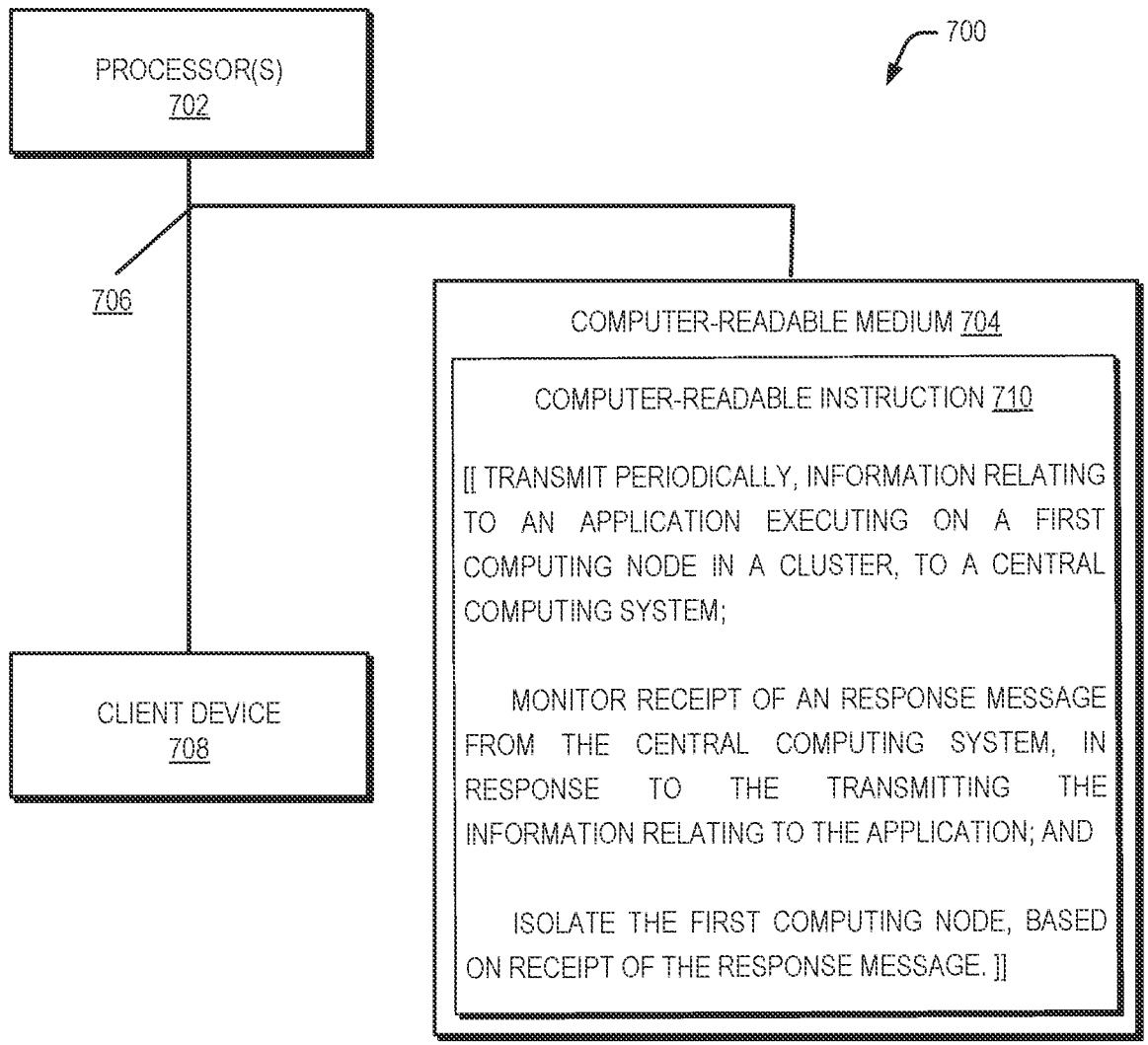
FIG. 7 illustrates a system environment implementing a non-transitory computer readable medium for managing applications in a cluster, as per an example.

FIG. 7 illustrates a computing environment 700 implementing a non-transitory computer readable medium for handling application failover within a cluster, as per an example. In an example implementation, the computing environment 700 may be for example, the cluster 200. In an example, the computing environment 700 includes processor(s) 702 communicatively coupled to a non-transitory computer readable medium 704 through a communication link 706. The processor(s) 702 may have one or more processing resources for fetching and executing computer-readable instructions from the non-transitory computer readable medium 704. The processor(s) 702 and the non-transitory computer readable medium 704 may be implemented, for example, in the cluster 200.

The non-transitory computer-readable medium 704 may be, for example, an internal memory device or an external memory device. In an example, the communication link 706 may be a direct communication link, such as any memory read/write interface. In another example, the communication link 706 may be an indirect communication link, such as a network interface. The communication link 706 may be a single network or a combination of multiple networks and may use a variety of different communication protocols.

The processor(s) 702 and the non-transitory computer-readable medium 704 may also be communicatively coupled to a storage element 708. The storage element 708 enables the device bearing the processor(s) 702 and the non-transitory computer-readable medium 704 to service requests raised by client devices. For example, a client device may raise a request with the first cluster node 202 for accessing a file or executing an operation of certain. To service the request, the first cluster node 202 may access the storage element and perform operations of data stored therein.

Referring to FIG. 7, in an example, the non-transitory computer readable medium 704 includes instruction(s) 710 that cause the processor(s) 702 to handle an occurrence of failure in operation of an application 210 in a cluster 200. For example, the instructions 710 may be executed to cause a first agent 216 running on a first network card 214 to periodically transmit information to an assessment system 242. The first network card 214 is installed within the first computing node 202. The information messages being transmitted to the assessment system 242 comprises information pertaining to the applications 210 which may be installed and executing on the first computing node 202.

The instructions 710 may thereafter be executed to monitor the incoming response messages that may have been generated as an acknowledgment to the information being transmitted by the first agent 216. In an example, the incoming acknowledgment messages may have a periodicity which either may be based on the periodicity of the information messages or may be predefined, say based on the control policies 304. The instructions 710 may be further executed to isolate the first computing node 202 based on the receipt of the incoming acknowledgment messages. For example, if the periodicity of the incoming acknowledgment messages is greater than a predefined perform a failover operation during which the applications which are not functioning properly, e.g., the application 210-1, may be moved to a different computing node, such as the second computing node 204.

Although examples for the present disclosure have been described in language specific to structural features and/or methods, it should be understood that the appended claims are not necessarily limited to the specific features or methods described. Rather, the specific features and methods are disclosed and explained as examples of the present disclosure.

We claim:

1. A system comprising:
   at least one processor; and
   a non-transitory machine-readable storage medium comprising instructions executable by the at least one processor to:
   send, from the system over a network to a first programmable network adapter in a first computing node, control information specifying initialization of a first agent at the first programmable network adapter and a first periodicity at which the first agent sends information messages;
   receive, at the system from the first agent executed on the first programmable network adapter, the information messages in response to the control information, wherein the information messages relate to a program executing on the first computing node;
   determine a second periodicity at which the first agent sends the information messages to the system over the network;
   compare the determined second periodicity to the first periodicity specified in the control information;
   based on a determination that the determined second periodicity is different from the first periodicity specified in the control information, move the program from the first computing node to a second computing node; and
   send instructions to a second agent executed on a second programmable network adapter in the second computing node to manage the program on the second computing node.

2. The system of claim 1, wherein the first agent monitors the program executing on the first computing node based on a control policy, wherein the control policy identifies the program and operational parameters of the program monitored by the first agent, and wherein the information messages comprise the operational parameters.

3. The system of claim 1, wherein the instructions are executable by the at least one processor to:
   based on the determination that the determined second periodicity is different from the first periodicity specified in the control information, instruct the first agent to isolate the program from a storage system.

4. The system of claim 1, wherein the instructions are executable by the at least one processor to:
   based on the determination that the determined second periodicity is different from the first periodicity specified in the control information, process operational parameters pertaining to the program and obtained from the information messages; and
   compare the operational parameters with predefined values,
   wherein the moving of the program from the first computing node to the second computing node is further based on the comparison of the operational parameters with the predefined values.

5. The system of claim 1, wherein the instructions are executable by the at least one processor to:
   obtain configuration information of the program, wherein the configuration information defines parameters used by the program during an operation of the program; and
   send, from the system to the second agent executed on the second programmable network adapter in the second computing node, the configuration information, wherein the program on the second computing node operates according to the configuration information.

6. The system of claim 4, wherein the operational parameters comprise a parameter relating to a health of the first computing node.

7. The system of claim 4, wherein the operational parameters are specified in the control information sent from the system to the first programmable network adapter.

8. The system of claim 1, wherein the instructions are executable by the at least one processor to identify the second computing node based on computational resources for processing the program.

9. A method comprising:
   sending, from a system over a network to a first programmable network adapter in a first computing node, control information specifying initialization of a first agent at the first programmable network adapter and a first periodicity at which the first agent sends information messages;
   receiving, at the system from the first agent executed on the first programmable network adapter, the information messages in response to the control information, wherein the information messages relate to a program executing on the first computing node;
   determining, by the system, a second periodicity at which the first agent sends the information messages to the system over the network;
   comparing the determined second periodicity to the first periodicity specified in the control information;
   based on a determination that the determined second periodicity is different from the first periodicity specified in the control information, moving, by the system, the program from the first computing node to a second computing node as part of a failover process; and
   sending, by the system, instructions to a second agent executed on a second programmable network adapter in the second computing node to manage the program on the second computing node after the failover process.

10. The method of claim 9, comprising:
    based on a determination that the determined second periodicity is consistent with the first periodicity specified in the control information, determining, by the system, that the first computing node is operating in a performant manner.

11. The method of claim 9, further comprising:
    based on the determination that the determined second periodicity is different from the first periodicity specified in the control information, instructing, by the system, the first agent to isolate the program from a storage system.

12. The method of claim 9, further comprising:
    based on the determination that the determined second periodicity is different from the first periodicity specified in the control information:
    processing, by the system, operational parameters pertaining to the program and obtained from the information messages, the operational parameters specified by the control information; and
    comparing, by the system, the operational parameters with predefined values
    wherein the moving of the program from the first computing node to the second computing node is further based on the comparison of the operational parameters with the predefined values.

13. The method of claim 11, further comprising:
    after instructing the first agent to isolate the program, obtaining, by the system, configuration information of the program, wherein the configuration information defines parameters used by the program during an operation of the program in the first computing node; and sending, from the system to the second agent executed on the second programmable network adapter in the second computing node, the configuration information, wherein the program on the second computing node operates according to the configuration information.

14. A non-transitory computer-readable medium comprising instructions that upon execution cause a system to:

send, from the system over a network to a first programmable network adapter in a first computing node, control information specifying initialization of a first agent at the first programmable network adapter and a first periodicity at which the first agent sends information messages;

receive, at the system from the first agent executed on the first programmable network adapter, the information messages in response to the control information, wherein the information messages relate to a program executing on the first computing node;

determine a second periodicity at which the first agent sends the information messages to the system over the network;

compare the determined second periodicity to the first periodicity specified in the control information;

based on a determination that the determined second periodicity is different from the first periodicity specified in the control information, move the program from the first computing node to a second computing node as part of a failover process; and send instructions to a second agent executed on a second programmable network adapter in second computing node to manage the program on the second computing node.

15. The non-transitory computer-readable medium of claim 14, wherein the instructions upon execution cause the system to:

based on the determination that the determined second periodicity is different from the first periodicity specified in the control information, instruct the first agent to isolate the program from a storage system.

16. The non-transitory computer-readable medium of claim 14, wherein the instructions upon execution cause the system to:

based on the determination that the determined second periodicity is different from the first periodicity specified in the control information, process operational parameters pertaining to the program and obtained from the information messages; and compare the operational parameters with predefined values, wherein the moving of the program from the first computing node to the second computing node is further based on the comparison of the operational parameters with the predefined values.

17. The non-transitory computer-readable medium of claim 15, wherein the instructions upon execution cause the system to:

after instructing the first agent to isolate the program, obtain configuration information of the program, wherein the configuration information defines parameters used by the program during an operation of the program in the first computing node; and send, from the system to the second agent executed on the second programmable network adapter in the second computing node, the configuration information, wherein the program on the second computing node operates according to the configuration information.

18. The non-transitory computer-readable medium of claim 16, wherein the operational parameters comprise a parameter relating to a health of the first computing node, and the operational parameters are specified in the control information sent from the system to the first programmable network adapter.

19. The method of claim 9, further comprising:

identifying, by the system, the second computing node based on computational resources for processing the program.

20. The non-transitory computer-readable medium of claim 14, wherein the instructions upon execution cause the system to:

identify the second computing node based on computational resources for processing the program.

* * * * *